June 24, 1969  R. H. HARTJEN  3,451,142
TEACHING MACHINE
Filed March 13, 1961

United States Patent Office 3,451,142
Patented June 24, 1969

3,451,142
TEACHING MACHINE
Raymond H. Hartjen, Rochester, N.Y., assignor, by mesne assignments, to Graflex, Inc., Rochester, N.Y., a corporation of Delaware
Filed Mar. 13, 1961, Ser. No. 95,102
Int. Cl. G09b 3/00, 7/00
U.S. Cl. 35—9         15 Claims This invention relates to what in modern parlance is commonly called a teaching machine, namely, a device or appliance whereby a student may present to himself, without the current aid of any other person, successive portions or segments of a previously prepared "program" or schedule of statements, questions, and answers, and may write down his own answer to each question before he is able to see the official or programmed answer, and may then see the official answer to compare the same with his own previously written answer, but only after shifting his own answer to a new position in which, although still visible to him, it can no longer be marked or altered. In this way the student is beyond the reach of the natural temptation to alter his own answer in the light of the correct official answer, yet he has the psychological advantage of being able to see the correct official answer immediately upon completion of writing his own answer and while he still has freshly in mind all details of his own train of thought in analyzing the question and arriving at his own answer. The very short interval between formulating his answer and then seeing the correct or approved answer is found in practice to be very beneficial to the learning process, enabling the student to see and profit from his mistakes to a much greater extent than was possible under the older practice before the introduction of teaching machines.

Such teaching machines, broadly, are already known in the art, and various "programs" are already available on the market from educational publishing houses in several forms, including both individual sheet form and continuous strip or roll form, and including both "expendable" form (where the student's answer is written on the same piece of paper as the program, so that the paper cannot be re-used) and "reusable" or "non-expendable" form (where the student's answer is written on a separate piece of paper, so that the paper containing the program can be used over and over again by a succession of students).

An object of the invention is the provision of a generally improved and more satisfactory teaching machine.

Another object is the provision of a teaching machine so designed and constructed as to be extremely simple and inexpensive, so that schools can easily afford to buy quantities of such machines, and even individual students can afford them for home use.

Still another object of the invention is the provision of a machine which, while still simple and economical, is adapted to use both programs in sheet form and programs in continuous strip form.

A further object is the provision of a teaching machine which, with minor and inexpensive modifications, may be used both for programs in expendable form and for programs in non-expandable or reusable form.

These and other desirable objects may be attained in the manner disclosed as an illustrative embodiment of the invention in the following description and in the accompanying drawings forming a part hereof, in which.

Figure 1:
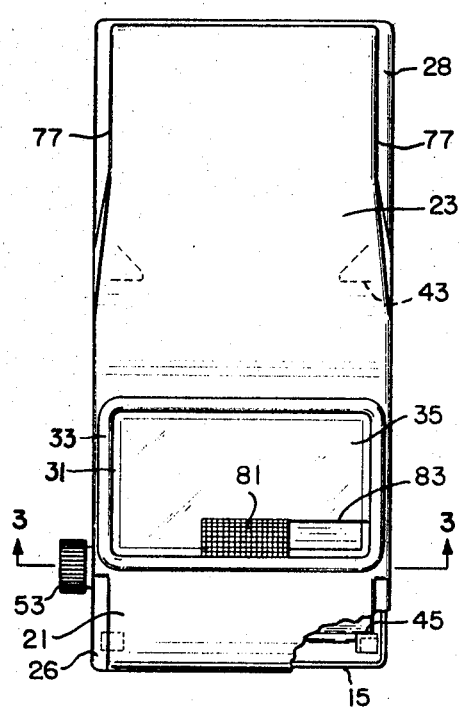
FIG. 1 is a plan of a teaching machine according to a preferred embodiment of the invention, adapted to use expendable programs.
Figure 2:
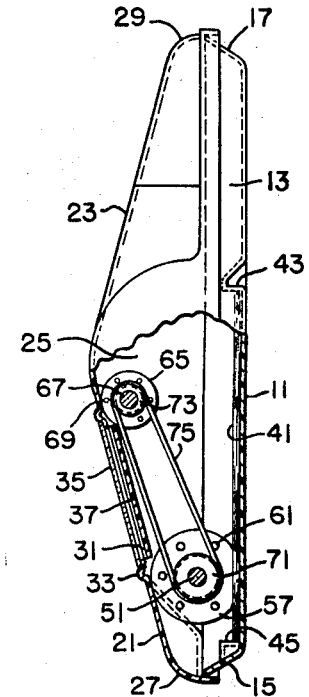
FIG. 2 is a right side elevation of the same, with parts broken away to show certain interior parts in vertical section.
Figure 3:
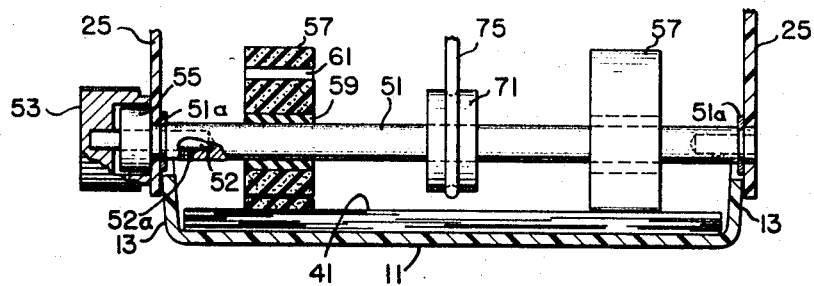
FIG. 3 is a fragmentary transverse vertical section taken approximately on the line 3—3 of FIG. 1.

Referring now to FIGS. 1–3, the first form of the invention comprises a hollow body having walls of suitable inexpensive material, for example molded plastic material. The body is conveniently in two main sections, the lower or base section comprising a bottom wall 11 turning upwardly at the sides to form rather low partial side walls 13, and turning upwardly at front and rear to form partial front and rear walls 15 and 17, respectively. These marginal walls 13, 15, and 17 all terminate at a common horizontal plane or top edge.

The upper section comprises a top wall, the front portion of which slopes downwardly and forwardly as seen at 21, at an angle conveniently forming a writing surface, and the rear portion slopes downwardly and rearwardly as indicated at 23, the oppositely sloping front and rear portions meeting with a smooth curve as seen in FIG. 2. Preferably molded integrally with the top walls 21, 23 are depending side walls 25 and front and rear walls 27 and 29, which fit telescopically over the side walls of the bottom section and may come down to the level of the bottom of the bottom section, although preferably the bottom edges of the side walls of the top section are somewhat elevated from the table or desk on which the device is placed, as shown. The side walls of the top section preferably have slight inwardly projecting protuberances or ledges 26 and 28 which rest on the upper edges of the bottom section, thus holding the bottom edges of the top section at the desired elevation. In addition, the lower margins of the side walls of the top section may resiliently embrace snugly the side walls of the bottom section, thereby holding the top and bottom sections resiliently engaged with each other. The molded plastic material from which the two sections are preferably made, has sufficient resiliency to enable the two parts to remain coupled together during ordinary handling, while allowing them to be forcibly sprung apart when it is desired to open up the device to obtain access to the interior.

In the front sloping wall 21 of the upper section there is a large opening or window 31 surrounded by an upstanding bead 33, into the space within which bead a mask member 35 may be tightly pressed and firmly held by the natural resilience of the molded material until it is forcibly removed to have a different mask member substituted, as further mentioned hereafter.

Beneath this opening 31 is a transverse plate or partition 37, spaced downwardly from the top wall far enough to allow passage of paper above the partition member 37 and below the top wall 21 or its mask 35. This partition member 37 may be supported from the side walls 25, either being molded integrally with them or being a separate piece fastened to the side walls by cement, welding, or otherwise. The member 37 provides a firm writing surface for supporting a sheet of paper in position so that it may be written upon through an opening in the mask 35 as further mentioned below.

The stack or pile of papers (usually called the "program") containing the statements if any, the related questions with which the student is to test himself, and the correct answers, is placed face downward on the bottom of the device as indicated at 41 in FIG. 2. To keep the fresh sheets in proper position for action of the feeding mechanism, the bottom wall 11 is preferably formed with an upstanding ridge or flange 43 which acts as a backstop for the back edge of the pile of sheets 41. The entire lower section of the casing is just slightly wider than the sheets, as best seen in FIG. 3. At the forward corners of the pile of sheets are two upstanding vertical abutment surfaces or stops 45, which restrain the forward corners of the sheets just enough to insure that only one sheet at a time will be fed forwardly when it is frictionally engaged on its top surface and urged forwardly. The frictional engaging and feeding means, as further explained below, makes contact with the upper surface of the top sheet of the pile and frictionally pushes it forwardly. Although the stops 45 tend to restrain the corners, nevertheless the top sheet itself will buckle sufficiently to allow the corners of the sheet to disengage themselves from the stops, to release the top sheet for feeding, but the pressure of the feeding rollers mentioned below, in conjunction with the stops 45, will continue to hold the underlying sheets sufficiently firmly to prevent disarrangement.

The present invention includes, as an important feature thereof, novel sheet feeding means of simple and inexpensive form. Extending transversely across the casing and journaled in the side walls 25 of the upper section is a transverse shaft 51 located a little to the rear of the front edges of the sheets 41, preferably about ¾ inch to one inch to the rear of the stops 45. Both ends of the shaft extend through the respective side walls 25 of the casing and terminate flush with the outer faces of the side walls. The shaft rotates freely in the casing walls, and is held against longitudinal or axial movement by C-clips or C-rings 51a sprung into circumferential grooves on the shaft, one just inside each side wall 25.

The shaft 51 is hollow, at least for a portion of its length at each end, and it may be of hollow or tubular form throughout its entire length, if desired. For rotating the shaft 51, a short shaft 52 is inserted into the hollow end of the shaft 51 and is fixed to it by means of a set screw 52a or the like. The external end of the shaft 52 carries a finger piece or knob 53 connected to the shaft 52 through a one-way clutch 55 of any conventional known construction. By reason of this one-way driving clutch 55, the knob 53 can be freely rotated in a counter-clockwise direction (viewed from the right, as in FIG. 2) without causing any movement of the shafts 51 and 52, but if the knob 53 is turned in a clockwise direction, the shafts 51 and 52 will turn with it. When the machine is to be used by a right-handed student, the knob 53 and its stub shaft 52 are secured to the left hand end of the main shaft 51, in the position shown in FIGS. 1 and 3, so that the student may turn the knob with his left hand and write his answers with his right hand. In that case, the one-way clutch 55 operates in the direction above mentioned. For a left-handed student, a different knob 53 and shaft 52 are secured at the right hand end of the main shaft 51, the clutch 55 in that case operating in the reverse direction from that above mentioned, so that clockwise rotation of the knob will still turn the shaft and counter-clockwise rotation will not.

Mounted on the shaft 51 are two feeding rollers 57, one near each end of the shaft. Each roller comprises a central core or hub 59 pinned or otherwise fixed to the shaft 51, and around this core an annular body of high friction and very compressible material, such for example as foam rubber, or foam plastic, or a mixture of foam plastic and rubber particles, or a mixture of foam plastic or foam rubber and cork particles. Whatever the material of the feed roller may be, it is preferably formed with a circumferentially spaced series of axial holes or bores 61, parallel to the shaft or axis 51. It is found that when using feeding rollers of this construction, the roller is sufficiently compressible in a radial direction so that the bottom edge thereof can be flattened to a rather great extent (as seen for example in FIG. 2) in order to accommodate the thickness of the pile of paper 41, and yet the roller will produce sufficient frictional force on the top sheet of the pile so that rotation of the roller will feed the sheets one by one with sufficient force to buckle the corners of the top sheet out of the restraint of the retaining stops 45. As successive sheets are fed from the pile, the pile of course becomes thinner and thinner, so that there is successively less and less flattening or radial compression of the bottom part of the feeding roller, and with the particular construction above mentioned it is found that a roller having an uncompressed diameter of about two or two and a half inches can compress and expand radially to a sufficient extent so that it will feed satisfactorily all the sheets of a stack or pile containing, say, 40 sheets of paper and having an initial thickness of, say, one-half inch or more.

The shaft 51 is placed at such an elevation that the top edge of the feeding rollers 57 will just barely touch the top wall 21 of the casing or housing, and the bottom edge of the feeding rollers will make firm contact with the bottom wall 11 when no paper is present in the pile 41, thus insuring adequate traction for feeding the last sheet of paper. Of course when a pile of paper is present, the bottom part of the feeding rollers will be flattened or compressed upwardly in a radial direction, as already mentioned. The placing of the feeding rollers 57 somewhat rearwardly (preferably about ⅞ inch rearwardly) from the front edge of the sheets 41 allows sufficient space in front of the rollers for the top sheet to buckle in the required manner to release it from the retaining corner stops 45.

As well seen in FIG. 2, the feeding rollers 57 are close to the forward edge of the mask receiving opening 31 and to the forward edge of the support plate 37. As the knob 53 is turned in a clockwise direction (viewed as in FIG. 2) the top sheet from the pile 41 will be fed forwardly, as above explained, and the advancing front end of the sheet will abut against the upwardly sloped front portion 15 of the bottom section, which will deflect the advancing edge of the paper sheet upwardly. The natural stiffness and resiliency of the paper sheet will cause it to continue around the curve (well seen in FIG. 2) of the front end of the top section and to press upwardly against the underside of the top wall 21 of the housing, until it enters the nip between the top of the feeding rollers 57 and the wall 21, whereupon the feeding will continue both by reason of the engagement of the sheet with the upper part of the rollers 57, and by reason of the fact that the sheet is still being pushed forwardly by engagement with the lower part of the rollers 57, until the trailing end of the sheet finally passes the lower part of the rollers. The advancing or leading end of the sheet will enter the space between the mask 35 and the supporting plate 37, and will be advanced (now in rearward direction relative to the casing or housing) so that certain successive portions of the sheet will be seen by the student through the transparent portions of the mask 35, as further described below. Meanwhile continuing with the description of the feeding operation, the advancing edge of the sheet will continue rearwardly until, at just about the rear edge of the supporting plate 37 and rear edge of the mask opening 31, it comes in contact with a second pair of feeding rollers 65 mounted on a second cross shaft 67 journaled in the side walls 25 of the upper section of the casing. These rollers 65 are preferably of the same construction as the feeding rollers 57, having the same axial holes 69 therein, like the axial holes 61 above described.

The shaft 67 is of the same kind (hollow at least at both ends, or throughout its entire length if desired) and is mounted in the same way (held against axial movement by C-clips or C-rings just inside the side walls of the casing) as the other shaft 51. It is operatively connected to the first shaft 51 to be driven thereby, preferably with a slight speed-up so that the peripheral speed of the rollers 65 is slightly greater than that of the rollers 57. The interconnection between the two shafts may take various forms; for example, a pulley 71 on the shaft 51, and a pulley 73 on the shaft 67, the two pulleys being connected by a belt 75 which runs over both of them.

The rollers 65 may be of the same diameter as the rollers 57, or of different diameters, but in either event, the diameters of the respective pulleys 71 and 73 are so related to the diameters of their respective rollers, and to each other, that the peripheral speed of the rollers 65 is slightly greater than that of the rollers 57. Thus although successive sheets will be somewhat overlapped with each other when they leave the first set of feeding rollers 57 (the degree of overlap depending upon the distance that the rollers 57 are set rearwardly from the corner stops 45) the faster travel of the second set of rollers 65 will cause a first sheet to pull ahead faster than the sheet following it, so that the initial overlap is eliminated about the time that the advancing edge of a fresh sheet reaches a usable position beneath the mask 35.

Continued rotation of the feeding knob 53 will cause the sheet to continue rearwardly to the rear part of the casing or housing, until the trailing edge of the sheet passes the second set of feed rollers 65, whereupon the sheet will drop down into the bottom part of the housing. As successive sheets are fed, they will pile up one on top of the other in the rear part of the housing. Depending upon the dimensions of the sheets as compared with the dimensions of the housing, the gradually increasing pile of used sheets may partially overlap the rear end of the gradually decreasing pile of fresh sheets waiting to be used, but this does not matter. The side walls of the rear portion of the upper section of the housing converge slightly in a rearward direction, as seen at 77, to provide lateral guidance for the rearwardly advancing end of the sheet. At the bottom edges of the converging walls 77, the walls extend horizontally outwardly to form the above mentioned ledges 28 which rest on the top edge of the bottom section of the housing, to support the rear part of the upper section from the lower section.

Referring now to the characteristics of the mask 35 which has been briefly mentioned above, the details of the mask depend upon the details of the program with which it is to be used; that is, the arrangement on the program sheets of the questions, the statements (if any) which relate to the questions, the correct answers, and the spaces for the student to write his own answers. Different programs published by different publishing houses are arranged in different ways, but in general a typical program comprises a series of statements ending in fill-in type sentences or in questions, arranged on the sheet in a column occupying, for example, the left hand one-third of the width of the program sheet; the correct answers to those questions or the correct fill-ins for the fill-in type sentences are arranged opposite the respective statements or questions in a column occupying, for example, the middle third of the sheet; and spaces for the student to write his own answers or fill-in words are in a column occupying, for example, the right hand third of the sheet. When the program sheets are of the typical form just mentioned, the mask 35 may be of the form shown in FIG. 1, the main portion of the mask being transparent, and having an opaque area 81 occupying the middle third of the lower part of the mask, and having an opening 83 occupying the right hand third of the lower part of the mask.

By turning the knob 53, the student advances the top program sheet from the pile 41 in the bottom of the housing, to a position where the first question appears at the bottom edge of the transparent portion at the left hand side of the mask 35. The correct answer to the question is at this time covered by the opaque portion 81 so that the student cannot see the answer. By using a pen or pencil, he then writes his own answer on the sheet, through the opening or writing window 83. He then turns the knob again to advance the program sheet, which brings the question he has just answered to an elevation higher up the mask 35, and a second question appears where the first one was previously. The answer to the first question now appears above the opaque portion 81, and at the same time his own answer previously written through the writing window 83 is moved upwardly above the top of the writing window so that he can no longer change it if he sees that his answer was wrong.

The student now proceeds to answer the second question which has now appeared in the transparent part, and the action is repeated as before. While each question is being answered, the previous question (or perhaps two or three previous questions) and its correct answer as well as the student's own answer will still be visible through the rather large transparent area of the mask 35, for whatever help they can give him in answering the new question. But because of the opaque portion 81, he is never able to see the correct answer to the immediate question, until after he has written his own answer. If he attempts to move the question further up the mask (that is, feed the sheet further rearwardly) until the answer appears, he will have lost his opportunity to write any answer to this question, because the answer must be written in the space opposite the question, rather than in a subsequent space. Any attempt to move the sheet up to the point where the answer can be seen, and then to move it back in a reverse direction in order to write the answer after seeing the printed answer, will be fruitless because of the one-way clutch 55 which prevents reverse movemet of the feeding rollers. But instead of using a one-way clutch, which is the preferred construction, it is also possible to fix the knob 53 rigidly to the shaft 51, and to provide the shaft with a ratchet wheel engaged by a pawl mounted on the casing, to prevent retrograde rotation. While this alternative construction is possible, it is less desirable, because the student may try to turn the knob backwards with sufficient force to break or damage the pawl and ratchet arrangement. With the preferred construction, the knob can be turned backwards freely and harmlessly.

In describing the operation of the device, reference has been made to the use of individual program sheets arranged in a pile. However, it is apparent that the same construction may be used for feeding a program printed on a long continuous strip of material either drawn from a roll of paper contained in an appropriate place in the housing, or drawn from a strip which is folded back and forth like the pleats of an accordion.

As above mentioned, teaching machines in general are already known. However, the present construction as above described is particularly simple, economical, light, compact, and very reliable in the sheet feeding operation, which has given much trouble in other types of teaching machines.

The mechanism as thus far described is intended primarily for use with an expendable program, where the answers are written on the same sheet of paper as the questions, so that the same sheets cannot be used again by another student. But it is within the scope of the present invention to use the mechanism with a non-expendable program, where the student's answers are written on a piece of paper separate from the questions, so that the same question sheets may be used over and over again by successive students, with only the written answer sheets having to be discarded and replaced. The present construction lends itself very well to such use.

Figure 4:
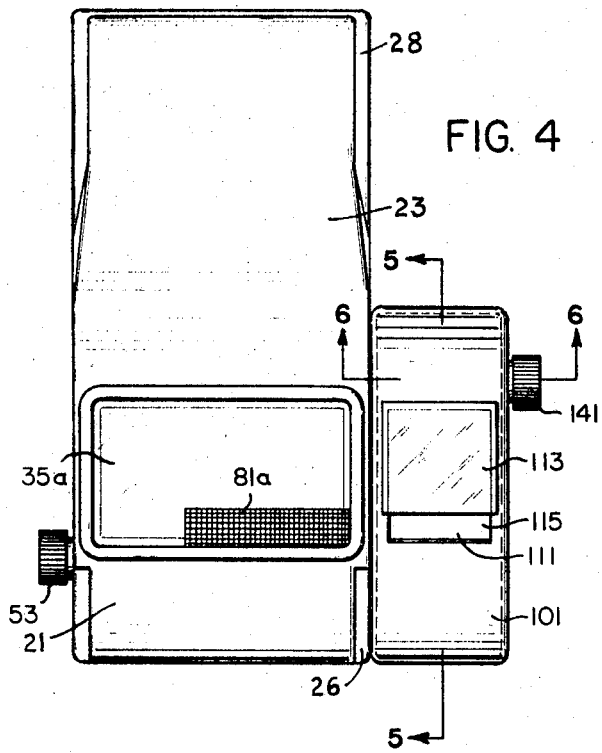
FIG. 4 is a plan of the machine shown in FIG. 1 with a modification and attachment to adapt it to a non-expendable or reusable program.
Figure 5:
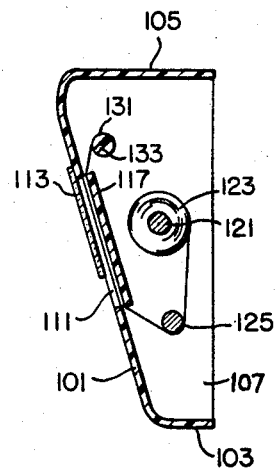
FIG. 5 is a vertical section taken longitudinally through the answer sheet attachment, approximately on the line 5—5 of FIG. 4.
Figure 6:
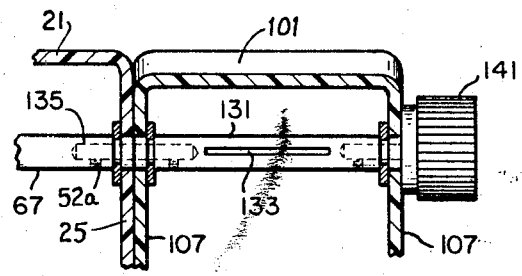
FIG. 6 is a fragmentary transverse vertical section taken approximately on the line 6—6 of FIG. 4.

Referring now to FIGS. 4–6, the main body of the machine is the same as above described in connection with FIGS. 1–3, except that the mask 35 is taken out and replaced by another mask 35a whose opaque portion 81a covers not only the middle column (middle third) but also the right hand column (or third) of the lower portion of the mask. There is no writing window in this mask, as the answers are to be written on separate sheets.

For the written answer, there is a separate casing or housing likewise preferably made of molded plastic material, having a downwardly and forwardly inclined top 101, a front wall 103, a rear wall 105, and side walls 107. A bottom may be provided if desired, but this is not essential.

In the sloping top wall 101 there is a large window opening 111, only the upper portion of which is covered by a permanent transparent plate 113, leaving the lower portion open as seen at 115, to serve as a writing window. A plate 117 (similar to the plate 37 in the main casing section) underlies the window 111, to support the paper and to provide a firm pressure surface for writing thereon.

When it is desired to use a reusable or non-disposable program, the supplementary casing 101, 103, etc., is attached to the right hand side of the main casing in the position shown in FIG. 4, for use by a right-handed student, or to the left hand side of the main casing, for use by a left-handed student, by any suitable attaching means of conventional known kind, such as snap fasteners, hooks, screws, or the like. In this position, the inclined upper surface 101 of the supplementary casing forms a smooth rightward continuation of the inclined surface of the front portion of the main casing.

Journaled in the side walls of the supplementary casing is a shaft 121 on which a roll of answer paper 123 is placed, this being similar, for example, to the conventional roll of paper commonly used in a modern adding machine. From this roll, the paper is withdrawn forwardly, around a shaft 125 which merely guides the strip of paper, and it then passes from this shaft to the space between the support plate 117 and the top wall 101, extending rearwardly and upwardly along the top face of the support plate 117 to the take-up shaft 131 having a diametrical slot 133 in it, like the slot in the take-up spool of a photographic camera. By threading the forward end of the strip of the paper into this slot, just the way the film is threaded in a camera, the paper is connected to the shaft 131 sufficiently so that rotation of the shaft will serve to pull the paper forwardly, the way paper is advanced by rotating the take-up spool of a photographic camera.

The answer strip should be fed in synchronism with the main or question sheet or strip of the program, of course, and for this purpose the shaft 131 is operatively coupled to one of the two shafts 51 and 67 in the main casing. Preferably the shafts 125 and 131 are so placed in the supplementary casing that when the supplementary casing is attached to the main casing, the shafts 125 and 131 will be axially alined respectively with the shafts 51 and 67. The shafts 125 and 131 are both hollow (at least at their ends) and are mounted in the side walls of the supplementary casing in the same way as above described for mounting the main shaft 51 in the main casing. All the shafts have radial set screws at both ends, for fastening smaller shafts or stub shafts (like 52) which may be inserted in the hollow ends of the larger shafts. A short shaft 135 is inserted in the hollow ends of the alined shafts 67 and 131 and fixed to both by the set screws, and another short shaft is preferably inserted in the hollow ends of the alined shafts 51 and 125 and fixed to both by the set screws. These shafts thus form additional connections securing the supplementary casing firmly to the main casing, on either side desired.

With this construction, rotation of the feeding knob 53 on the main casing will rotate the shaft 67 (because of the belt connection 75) and the shaft 67 will rotate the shaft 131 to draw successive portions of the answer paper from the supply roll 123, bringing successive portions thereof to the writing window 115 so that the student may write his answers. Then when he turns the knob 53 to bring the next question into view, the answer previously written on the strip of paper from the roll 123 will be advanced to a position under the transparent window 113 where it is still visible but no longer accessible for alteration. The shaft 125 will also turn with the shaft 51, but this is of no moment since the shaft 125 serves only as a paper guide to change the direction of the paper and does not actually perform a feeding function.

If desired, a second feeding knob 141 may be placed on right hand end of the shaft 131, this being desirable especially to aid in turning the shaft during the initial threading of the paper when the mechanism is being set up to start operation. This may be a duplicate of the above mentioned knob placeable on the right end of the shaft 51 for use by a left-handed student. In other words, the knob 141 is mounted through a one-way clutch on a short shaft inserted in the right hand end of the shaft 131 and fixed to it by a set screw. Of course if the entire supplementary casing is placed on the left of the main casing, for a left-handed student, then the knob 141 would be placed on the left end of the shaft 131, and the one-way clutch thereof would work in the opposite direction, like the described clutch 55 of the knob 53 on the left end of the shaft 51 in FIG. 3.

In order that an adequate quantity of paper may be wound in successive convolutions on the shaft 131, the shaft should be spaced a substantial distance from the closest interfering parts such as the rear edge of the plate 117, or the surface of the top wall 101 of the supplementary casing. As already stated, it is desirable to have the shaft 131 axially alined with the shaft 67 of the main casing. But if this does not allow sufficient capacity of paper to be wound on the shaft 131, the main casing could be designed to have the shaft 67 in a somewhat lower position than the one illustrated in FIG. 2, by the simple expedient of making the feeding rollers 65 on this shaft of somewhat larger diameter. The lower position of the shaft 67 would result in a lower position of the alined shaft 131 in the supplementary unit, giving greater take-up capacity to this shaft. Or again, the roll of answer paper may be wound up or taken up on a separate take-up shaft in a location further back in an enlarged rear portion of the supplementary casing, the take-up shaft being driven by a belt or the like from the shaft 131 which is alined with and operatively connected to the shaft 67.

The present construction, in addition to being inexpensive manufactured, is quite versatile in utility. The main casing can be used alone with an expendable program. If a non-expendable program is to be used, the supplementary casing can be quickly attached. If the program sheets require a mask having a different size or arrangement of transparent, opaque, and open areas, the mask 35 (or 35a) can be quickly replaced by another one having the required characteristics.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A teaching machine comprising a casing having an upper casing section and a lower casing section, an opening in a top wall of said upper section, a support plate beneath said opening and spaced slightly below said opening, a mask member interchangeably mounted in said opening, and being partially cut away to provide a writing window said mask member including a transparent portion and an opaque portion, means in said lower casing section for holding a supply of program paper, feeding means in said casing for feeding successive portions of said program paper from supply position to a position overlying said support plate and underlying said mask member and through the space between said support plate and said mask member, the opaque portion of and the writing window in said mask member being disposed at the entering edge of said space and being aligned laterally and together occupying less than the full width of said mask member, said opaque portion and said writing window being of the same height measured in the direction of feed of the program paper, but being both of less height, so measured, than said mask member whereby a part of the program paper in said space will be visible through a part of the transparent portion of said mask member while another part of the program paper will be concealed by said opaque portion, and a third part of the program paper will be accessible through said writing window for writing thereupon, and whereby the concealed part of the paper will not be visible through a transparent part of the mask member until the laterally aligned part of the program paper has been fed beyond the writing window and manual operating means for turning said feed roller means to feed said program paper only in a forward direction from said supply position thereof to said viewing position thereof, while preventing movement of said feed roller means in a reverse direction.

2. A teaching machine comprising a casing having an upper casing section and a lower casing section, an opening in a top wall of said upper section, a support plate beneath said opening and spaced slightly below said opening, a mask member interchangeably mounted in said opening and being partially cut away to provide a writing window, said mask member including a transparent portion and an opaque portion, means in said lower casing section for holding a supply of program paper, feeding means in said casing for feeding successive portions of said program paper from supply position to a position overlying said support plate and underlying said mask member and through the space between said support plate and said mask member, the opaque portion of and the writing window in said mask member being disposed at the entering edge of said space and being aligned laterally and together occupying less than the full width of said mask member, said opaque portion and said writing window being of the same height measured in the direction of feed of the program paper, but being both of less height, so measured, than said mask member whereby a part of the program paper in said space will be visible through a part of the transparent portion of said mask member while another part of the program paper will be concealed by said opaque portion, and a third part of the program paper will be accessible through said writing window for writing thereupon, and whereby the concealed part of the paper will not be visible through a transparent part of the mask member until the laterally aligned part of the program paper has been fed beyond the writing window, and manual operating means for turning said feed roller means to feed said program paper only in a forward direction from said supply position thereof to said viewing position thereof, while preventing movement of said feed roller means in a reverse direction, said paper feeding means including a shaft, and a paper engaging feed roller mounted on said shaft, said feed roller being of relatively highly compressible foam material and having a circumferentially spaced series of openings extending parallel to said shaft, at points intermediate said shaft and the outer periphery of said roller, to increase the radial compressibility thereof.

3. A teaching machine comprising a casing having an upper casing section and a lower casing section, an opening in a top wall of said upper section, a support plate beneath said opening and spaced slightly below said opening, a mask member interchangeably mounted in said opening and being partially cut away to provide a writing window, said mask member including a transparent portion and an opaque portion, means in said lower casing section for holding a supply of program paper, feeding means in said casing for feeding successive portions of said program paper from supply position to a position overlying said support plate and underlying said mask member and through the space between said support plate and said mask member, the opaque portion of and the writing window in said mask member being disposed at the entering edge of said space and being aligned laterally and together occupying less than the full width of said mask member, said opaque portion and said writing window being of the same height measured in the direction of feed of the program paper, but being both of less height, so measured, than said mask member whereby a part of the program paper in said space will be visible through a part of the transparent portion of said mask member while another part of the program paper will be concealed by said opaque portion, and a third part of the program paper will be accessible through said writing window for writing thereupon, and whereby the concealed part of the paper will not be visible through a transparent part of the mask member until the laterally aligned part of the program paper has been fed beyond the writing window, and manual operating means for turning said feed roller means to feed said program paper only in a forward direction from said supply position thereof to said viewing position thereof, while preventing movement of said feed roller means in a reverse direction, said paper feeding means including a feed roller so positioned that the bottom portion of the roller engages paper in the bottom portion of the casing to advance such paper as the roller turns, and the top portion of the same roller engages the advancing paper approximately as it enters the space between said mask and said support plate.

4. A construction as defined in claim 3, in which said paper feeding means includes a second roller engaging the paper approximately as it leaves the space between said mask and said support plate, and means for driving said second roller at a peripheral speed greater than that of said first mentioned roller.

5. A teaching machine comprising a main casing having top wall and means for holding within said casing a supply of program paper, an observation window in said top wall, feeding means in said main casing for feeding successive portions of program paper from supply position to observation position beneath said observation window, a supplementary casing detachably connected to said main casing, said supplementary casing having a top wall having an opening therein, a transparent mask covering a portion of said opening while leaving a portion thereof open, a support plate beneath at least the open portion of said opening to support paper in position to be written upon through said open portion, means for holding a supply of answer paper in said supplementary casing, feeding means in said supplementary casing for feeding successive portions of answer paper from supply position to writing position overlying said support plate and underlying said opening, and means operatively connecting said feeding means in said main casing and said feeding means in said supplementary casing to each other, for joint movement.

6. A construction as defined in claim 5, in which said feeding means in said main casing includes a first shaft extending transversely across the interior of said main casing and in which said feeding means in said supplementary casing includes a second shaft extending transversely across the interior of said supplementary casing, said first shaft and said second shaft being axially alined with each other with their adjacent ends substantially abutting each other when said supplementary casing is attached in normal operative relation to said main casing, and means interconnecting the adjacent ends of said two shafts for conjoint rotation.

7. A construction as defined in claim 6, in which said interconnecting means includes axial bores in the adjacent ends of both shafts, a stub shaft extending into the bores of both of said first mentioned shafts, and set screws respectively fixing the ends of said stub shafts to both of said first mentioned shafts.

8. A construction as defined in claim 7, further including a manual feeding knob detachably connected to that end of one of said two first mentioned shafts which is remote from the other of said two first mentioned shafts.

9. A construction as defined in claim 8, in which said knob is operatively connected to the shaft on which it is mounted through a one-way driving clutch.

10. A teaching machine comprising a housing having a top wall which has an opening therein, a mask member secured in said opening and having a transparent portion and an opaque portion, a support plate mounted in stationary position substantially parallel to and slightly below said mask member means in said housing for holding a stack of sheets of program paper at a point spaced from and below said support plate, and paper feeding means for feeding successive sheets from said stack to a viewing position above said support plate and beneath said mask member and for advancing them across said support plate, said paper feeding means including a first feed roller for engaging a sheet near an entering edge of said support plate, a second feed roller for engaging a sheet near an opposite leaving edge of said support plate, manually operable means for rotating one of said feed rollers in one direction and preventing rotation thereof in the opposite direction, and means for driving said second feed roller, upon manual rotation of one of said rollers in said one direction, at a faster peripheral speed than said first roller so that said second roller will tend to advance a sheet in contact with it at a faster rate than a sheet in contact with the first roller and not with the second roller.

11. A teaching machine comprising a housing having an observation window and having means for holding a stack of sheets of program paper at a point spaced from said observation window, and paper feeding means for feeding successive sheets from said stack to and advancing them across said observation window, said paper feeding means including a first feed roller for engaging a sheet near an entering edge of said window, a second feed roller for engaging a sheet near an opposite leaving edge of said window, and manually operable means for driving said second feed roller at a faster peripheral speed than said first roller so that said second roller will tend to advance a sheet in contact with it at a faster rate than a sheet in contact with the first roller and not with the second roller, said manually operable driving means including a driving connection between the two rollers, a manually operable rotary knob, and a one-way clutch connection between said knob and one of said rollers, so that rotation of said knob in one direction will turn both of said rollers in a sheet advancing direction and rotation of said knob in an opposite direction will be ineffective to turn said rollers in either direction.

12. A teaching machine comprising a casing having a bottom wall adapted to receive and support a stack of sheets of program paper, a top wall having an observation window, a shaft arranged intermediate said walls and approximately parallel to both of them, and a paper feeding roller on said shaft, the lower portion of said roller engaging the top sheet of said stack and advancing such sheet from said stack by rotation of said roller, the upper portion thereof engaging a sheet in the vicinity of said observation window to feed such sheet to said window, said roller being of such diameter that it will bear against said bottom and top walls with sufficient pressure to feed only a single sheet of paper interposed between said roller and said bottom or top wall, respectively, and being sufficiently compressible and resilient in a radial direction so that the roller will still feed the top sheet from the stack even when a stack of substantial thickness is interposed between said bottom wall and the lower portion of said roller.

13. A teaching machine comprising a casing having a bottom wall adapted to receive and support a stack of sheets of program paper, a top wall having an observation window, a shaft arranged intermediate said walls and approximately parallel to both of them, and a paper feeding roller on said shaft, the lower portion of said roller engaging the top sheet of said stack and advancing such sheet from said stack by rotation of said roller, the upper portion thereof engaging a sheet in the vicinity of said observation window to feed such sheet to said window, said roller being of such diameter that it will bear against said bottom and top walls with sufficient pressure to feed only a single sheet of paper interposed between said roller and said bottom or top wall, respectively, and being made of compressible foam material having a series of cavities extending through the foam material in directions approximately parallel to the axis of rotation of the roller, to make the roller sufficiently compressible and resilient in a radial direction so that the roller will still feed the top sheet from the stack even when a stack of substantial thickness is interposed between said bottom wall and the lower portion of said roller.

14. A teaching machine comprising a casing having an upper casing section and a lower casing section, an opening in a top wall of said upper section, a support plate in said opening, a mask member in said opening and being partially cut away to provide a writing window, said mask member including a transparent portion and an opaque portion, means in said lower casing section for holding a supply of program paper, feeding means in said casing for feeding successive portions of said program paper in a longitudinal direction from supply position to a viewing position overlyilng said support plate and underlying said mask member and through the space between said support plate and said mask member, the opaque portion of and the writing window in said mask member being disposed at the program paper entering edge of said space and being aligned transversely of said longitudinal direction and being of the same height, said opaque portion and said writing window occupying part of the width and height of the mask member whereby a part of the program paper in said space will be visible through the transparent portion of said mask member whereas a part of the program paper will be concealed and a part will be accessible for writing thereupon, said parts of the program paper being aligned transversely of said longitudinal direction, and whereby the concealed part of the paper will not be visible through the mask member until said transversely aligned part of the program paper accessible for writing has been moved beyond the writing paper, and manual operating means for turning said feeding means to feed said program paper only in a forward direction from said supply position thereof to said viewing position thereof while preventing movement of said feeding means in a reverse direction.

15. A teaching machine comprising a main casing having a top wall and means for holding within said casing a supply of program paper, an observation window in said top wall, feeding means in said main casing for feeding successive portions of program paper from supply position to observation position beneath said observation window, a supplementary casing detachably connected to said main casing, said supplementary casing having a top wall having an opening therein, a transparent mask covering a portion of said opening while leaving a portion thereof open, a support plate beneath at least the open portion of said opening to support paper in position to be written upon through said open portion, means for holding a supply of answer paper in said supplementary casing, feeding means in said supplementary casing for feeding successive portions of answer paper from supply position to writing position overlying said support plate and underlying said mask, and means operatively connecting said feeding mens in said main casing and said feeding means in said supplementary casing to each other for joint movement.

References Cited

UNITED STATES PATENTS

| | | | |
|---|---|---|---|
| 2,169,266 | 8/1939 | Matter | 35—9 |
| 2,791,425 | 5/1957 | Ford | 271—36 |
| 2,869,869 | 1/1959 | Bauer | 271—36 |
| 2,915,833 | 12/1959 | Genest | 35—22 |
| 2,564,089 | 8/1951 | Williams et al. | 35—9 |

LAWRENCE CHARLES, *Primary Examiner*

U.S. Cl. X.R.

271—36